July 16, 1968     H. C. RIBLETT, JR     3,392,937

CATAPULT SYSTEM AND METHOD OF LAUNCHING VEHICLES

Filed Nov. 2, 1966     2 Sheets-Sheet 1

INVENTOR.
HARRY C. RIBLETT, JR.

BY
*Meyer, Tilberry & Body*

ATTORNEYS

INVENTOR.
HARRY C. RIBLETT, JR.

BY
Meyer, Tilberry & Body
ATTORNEYS

United States Patent Office 3,392,937
Patented July 16, 1968

1

3,392,937
CATAPULT SYSTEM AND METHOD OF
LAUNCHING VEHICLES
Harry C. Riblett, Jr., Wilmington, Del., assignor to
E. W. Bliss Company, Canton, Ohio, a corporation of Delaware
Filed Nov. 2, 1966, Ser. No. 591,510
4 Claims. (Cl. 244—63)

ABSTRACT OF THE DISCLOSURE

A runway installed vehicle catapulting system includes a rail secured to the runway generally along the center line thereof. A dolly comprised of a pair of trucks runs along the rail, and a normally flat elastically deformable member interconnects the trucks. The elastic member has means to receive a towing element and a vehicle bridle and supports a portion of the vehicle, whereby the member elastically deforms in response to the system of forces exerted upon it during the launch stroke.

This invention relates to the art of vehicle accelerating methods and systems, and more particularly to an improved catapult system, and method of launching vehicles.

The present invention is particularly applicable to the launching or the catapulting of aircraft, and it will be described with particular reference thereto. However, it will be appreciated that the invention has broader applications and may be used in various other vehicle accelerating systems.

There is an existing need for an aircraft catapult system capable of launching aircraft from an unanchored, temporary runway, of the type formed from perforated aluminum mats.

Anchoring such a runway is a time consuming operation so that the anchor-free requirement follows from the necessary capability that the runway and catapult be installed and disassembled in a minimum period of time.

The difficulty presented by an unanchored runway is that it has a limited ability to resist a vertical force in an upward direction. With this limitation in mind, it has been proposed to design a catapult system wherein all of the forces applied to the system are in a horizontal direction. While such a system is useful in catapulting some aircraft, it is not universally applicable. This is particularly true with respect to aircraft designed for shipboard catapults. In such aircraft, the catpult hooks, generally located forward and below the aircraft's center of gravity, are designed for bridle angles of approximately 30° down from the horizontal. These hooks are not designed and generally cannot withstand a purely horizontally tow load. A catapult system which will satisfy the bridle angle requirements of such aircraft will necessarily impose an upward vertical component of force of substantial magnitude on the runway. In most, if not all cases, the magnitude of this force will exceed the limit of an unanchored runway's ability to resist an upward vertical force.

Thus, the present invention is addressed to a method of launching vehicles and to a catapult system useful in conjunction with unanchored runways, which satisfies the bridle angle requirements of aircraft to be launched therefrom, and at the same time, imposes a vertical upward force on the runway which is within, or substantially within, the runway's capability to resist.

In accordance with one aspect of the present invention, there is provided a method of launching a vehicle from a runway having a limited ability to resist an upward force, comprising the steps of: connecting one end of a bridle to the vehicle, which bridle when tensioned by application of a launch force to its free end, forms an angle with the horizontal sufficiently great to produce, in the resolved components of the tensioning force, a vertical component of substantial magnitude; and applying a tensioning force to the free end of the bridle, while simultaneously reducing the angle the bridle forms with the horizontal, thereby reducing the vertical component of the tensioning force to a value substantially within the runway's ability to resist.

In accordance with another aspect of the present invention, there is provided a runway installed vehicle catapulting system, comprising a rail secured to the runway generally along the center line thereof, a dolly comprising a pair of trucks having means connected thereto adapted to engage the rail from movement of the trucks therealong, a normally flat elastically deformable member interconnecting the trucks, which member has intermediate its ends (a) means operative to receive a towing element, (b) means operative to receive vehicle bridling means, and (c) means operative to receive a portion of the vehicle, whereby the member is operative to elastically deform in response to the system of forces exerted upon it during the launch stroke.

It is, therefore, an object of the invention to provide an improved method and an improved catapult sytem particularly adapted to launch vehicles from an unanchored runway.

A further object of the invention is to provide an improved method and an improved catapult system particularly adapted to launch vehicles from a runway having a limited ability to resist a vertical upward force.

Another object of the invention is to provide an improved method and an improved catapult system capable of satisfying the bridle angle requirements of an aircraft while simultaneously limiting the vertical upward component of force imposed on a runway, to a value substantially within the runway's ability to resist such a force.

Yet another object of the invention is to provide a vehicle catapulting system wherein the above described desiderata are accomplished by providing a dolly with an elastically deformable member operative to elastically deform in response to the system of forces exerted upon it during the launch stroke.

These and other objects and advantages will become apparent from the following detailed description of a preferred embodiment of the invention when read in connection with the accompanying drawings, in which.

Figure 1:
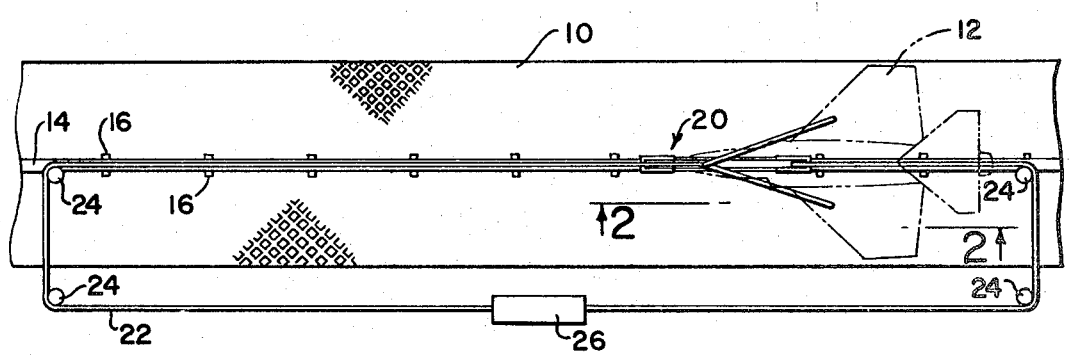
FIGURE 1, is a schematic top view showing the general organization of parts.
Figure 2:
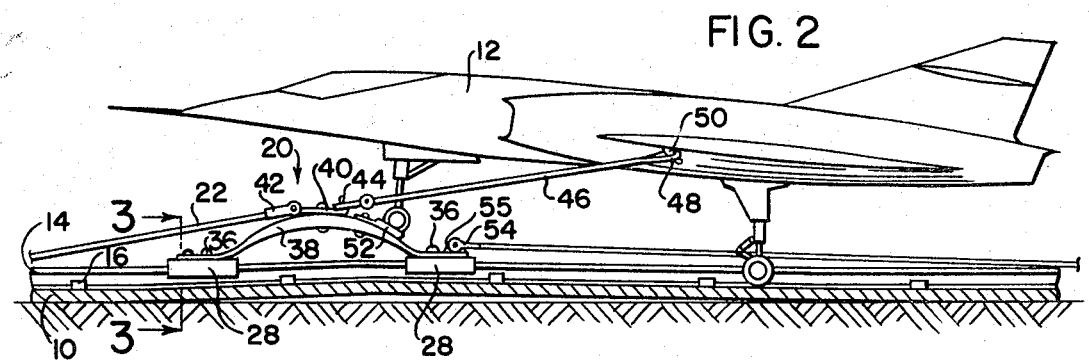
FIGURE 2 is a schematic side elevation view with parts in sections, taken generally along line 2—2 of FIGURE 1.

Referring now to the drawings wherein the showings are for purposes of illustrating a preferred embodiment of the invention only and not for the purpose of limiting the same, FIGURE 1 shows the general arrangement of parts including a runway 10 and an aircraft 12 in battery position, engaging catapult dolly designated generally as 20. Positioned generally along the center line of the runway is rail 14 secured to the runway by means of lugs 16 and bolts 18 (FIGURE 2). Engaging opposite ends of dolly 20 for movement along rail 14, is a linear towing element, hereinafter designated as cable 22. Sheaves 24 guide the cable along rail 14 and then off the runway into engagement with a power generating and power absorbing mechanism designated generally as 26.

The power generating and power absorbing mechanism forms no part of the present invention and therefore has not been detailed. Such mechanisms are well known to the prior art and generally include a prime mover operative to move the dolly from a battery position to a launch position, braking means to stop the dolly when it reaches the launch position, and a prime mover reversing means to return the dolly to its battery position.

Cable 22 may take the form of a single loop of cable or two separate pieces of cable operatively joined together by power generating and power absorbing mechanism 26.

Figure 3:
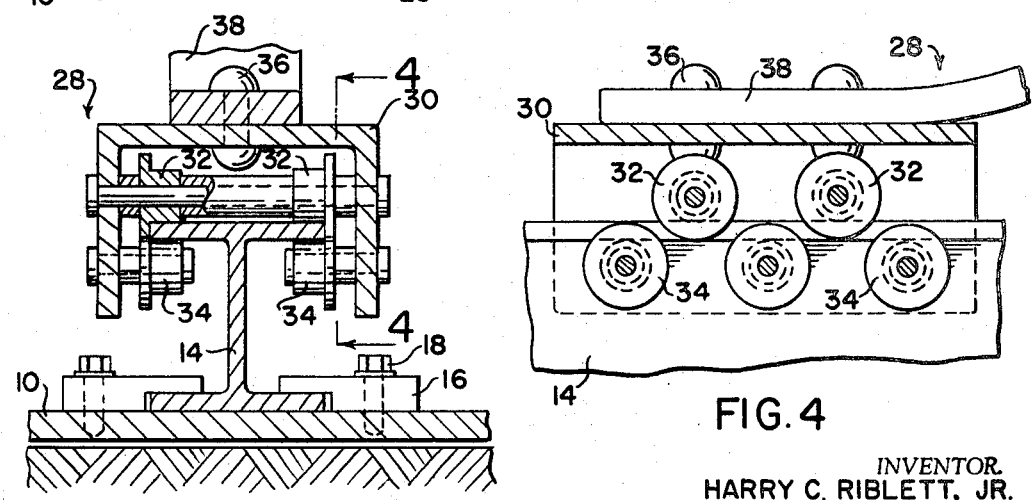
FIGURE 3, is a schematic sectional view, greatly enlarged, taken generally along line 3—3 of FIGURE 2.
Figure 4:
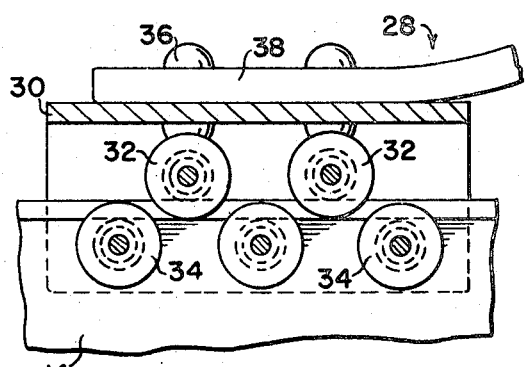
FIGURE 4, is a schematic sectional view, greatly enlarged, taken generally along line 4—4 of FIGURE 3.

Referring now to FIGURES 2, 3 and 4, dolly 20 comprises a pair of trucks designated generally as 28 adapted for movement along rail 14. Each truck 28 comprises a U-shaped beam 30 having secured to its side walls a plurality of upper flanged rollers 32 and lower flanged rollers 34, adapted to engage the upper and lower surfaces respectively of a portion of rail 14 for rolling movement therealong.

Interconnecting trucks 28 and secured thereto, as by means of rivets 36, is normally flat, elastically deformable, spring-like member 38. Attached to member 38 intermediate its ends is connector 40, having suitable means adjacent one end thereof, such as a bushing, adapted to receive for pinning, end clamp 42, which may take the form of a bifurcated yoke. Associated with the other end of connector 40 is a hook portion 44 adapted to receive a loop portion of bridle 46 (see FIGURE 7). Bridle 46 is provided with a pair of rings 48 adapted to connect with catapult hooks 50 located on the aircraft. Member 38 is also provided intermediate its ends with means adapted to receive a portion of the aircraft, such as wheel well 52 which is adapted to receive the front landing wheel of aircraft 12. Cable 22 is provided with an end clamp 54 which may take the form of a bifurcated yoke, which is adapted to engage an anchor 55 connected through member 38 to rear truck 28.

Figure 5:
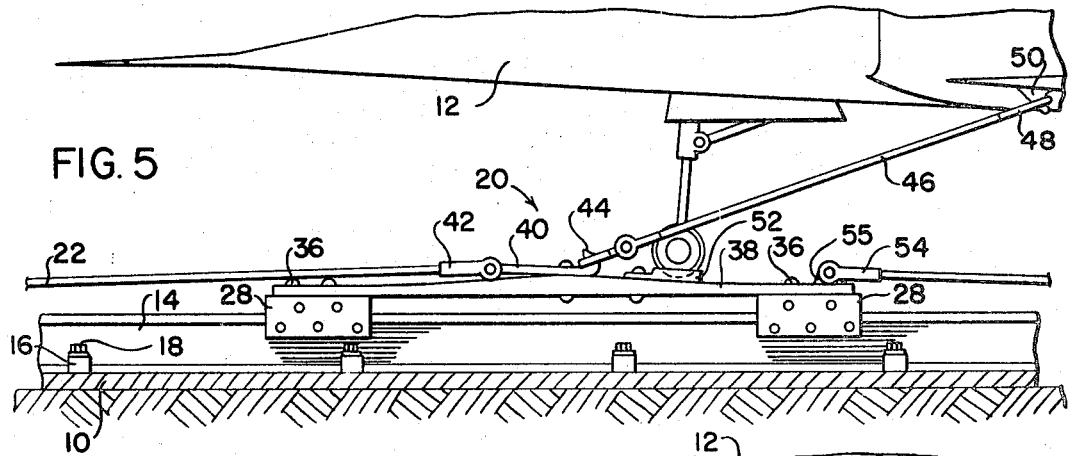
FIGURE 5, is a schematic side elevation view with parts in section, showing the catapult system with the catapult in its battery position, prior to the start of a launch stroke.

The operation of the catapult is as follows, reference being made to FIGURES 5, 6 and 7: with both ends of cable 22 attached to dolly 20, and with the dolly in its battery position, aircraft 12 is moved onto the runway and positioned so that its nose wheel engages wheel well 52. Bridle 46 is then connected by engaging rings 48 with catapult hooks 50 located on aircraft 12 behind and below the aircraft's center of gravity, and connecting the loop portion at the other end of bridle 46 to hook portion 44 of connector 40. Under the static forces operating on the system at this point (see FIGURE 5) normally flat, elastically deformable member 38 remains in its flat configuration.

Figure 6:
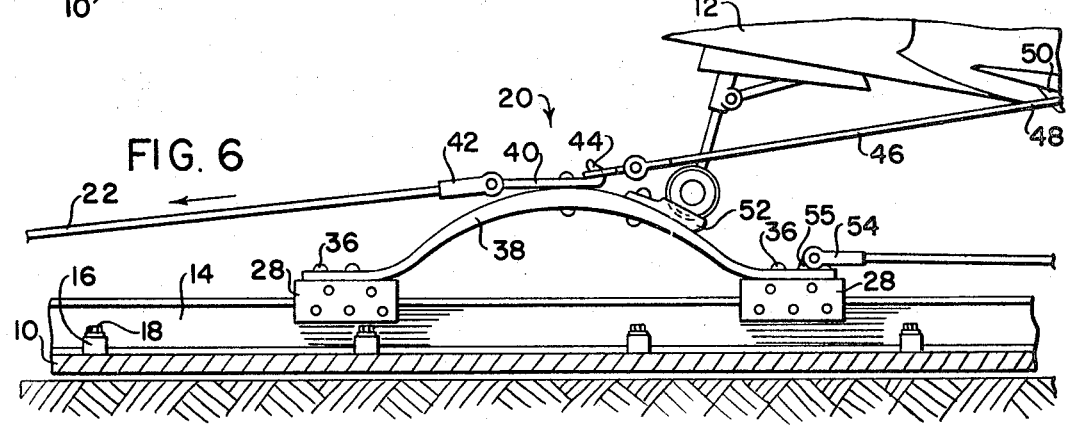
FIGURE 6, is a schematic side elevation view with parts in section, showing the catapult system during its launch stroke.
Figure 7:
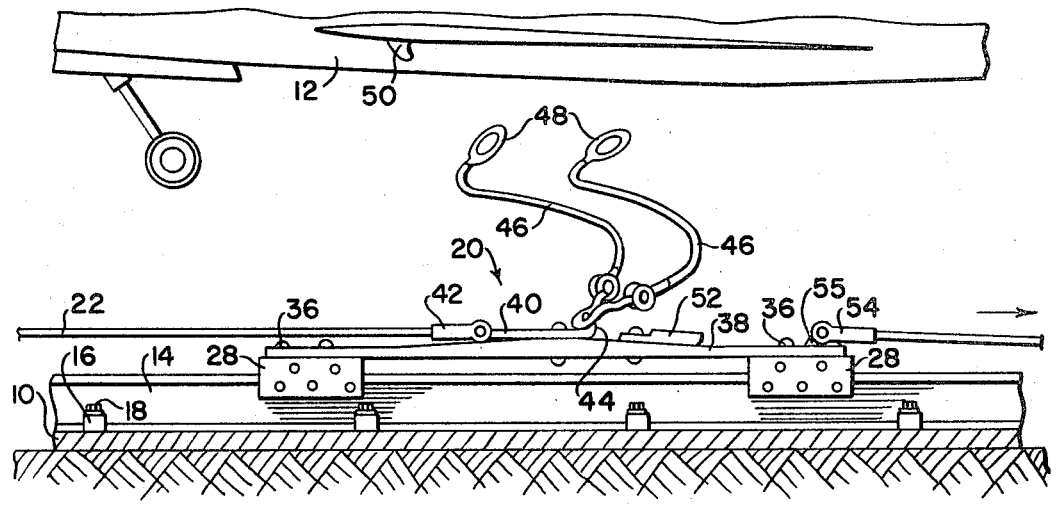
FIGURE 7, is a schematic side elevation view with parts in section, showing the catapult system after launch.

FIGURE 6 shows the system as it appears during the launch stroke with the full launch power being exerted on cable 22. This pulling force is transmitted to bridle 46 where it resolves itself into a vertical and a horizontal component. The horizontal component is reacted to principally by the inertias of the aircraft and the catapult dolly, and when these inertias are overcome, the dolly and aircraft move down the runway.

The horizontal component of force being below the aircraft center of gravity causes the tail of the aircraft to want to move vertically downward, and the nose to want to move vertically upward. The runway and the catapult dolly react by wanting to move vertically upward.

Due to the design of member 38, it reacts to the vertically upward force by deflecting upwardly, thereby absorbing part of the upward force, and diffusing part of the upward force through trucks 28 to rail 14. This reduces both the magnitude and the concentration of the upward force to which runway 10 must react.

In addition, the upward deflection of member 38 reduces the angle between bridle 46 and the horizontal. This in turn reduces the magnitude of the vertical force to which the system must react. Accordingly, the action of member 38 reduces to a manageable level, the magnitude and concentration of the upward force to which the runway must react. Whatever lifting the runway may undergo, it is not enough to disrupt a controlled launch.

Once member 38 has deflected, as it does at the beginning of the launch stroke, it remains in its deflected configuration until the aircraft is released at the launch point. As shown in FIGURE 7, when the aircraft has been released from bridle 46 and dolly 20, member 38 returns to its normal, flat configuration. Immediately following this, dolly 20 is braked to a stop, and the dolly is returned to its battery position by driving cable 22 in a clockwise direction as shown in the drawings.

The present invention has been described in conjunction with certain structural embodiments; however, it is to be appreciated that various structural changes may be made in the illustrated embodiment without departing from the intended scope and spirit of the present invention as defined in the appended claims.

Having thus described my invention, I claim:

1. A method of launching a vehicle from a runway having a limited ability to resist a vertical force, comprising the steps of: connecting one end of a bridle to said vehicle which bridle when tensioned by application of a launching force to its free end, forms an angle with the horizontal sufficiently great to produce, in the resolved components of the tensioning force, a vertical component of substantial magnitude to which said runway must react; and simultaneously (a) applying a tensioning force to the free end of said bridle, (b) reducing the angle said bridle forms with the horizontal, and (c) diffusing the application of said vertical component of force to said runway, thereby reducing the magnitude and concentration of the vertical component of said tensioning force to levels substantially within the runway's ability to resist the same.

2. The method as defined in claim 1 including the additional steps of moving said vehicle along said runway from a battery position to a launch position, and releasing said aircraft from said bridle at said launch position, thereby reducing to zero the angle formed between said bridle and the horizontal.

3. A dolly adapted for use in launching a vehicle from a runway comprising: a pair of trucks adapted to move along a track and to receive forces transmitted by said track; a normally flat, elastically deformable, spring-like member interconnecting said trucks, said member having means operative to receive a towing element and the forces transmitted thereby, means operative to receive a vehicle bridle and the forces transmitted thereby, and means operative to receive a portion of said vehicle and the forces transmitted thereby; said member being operative to elastically deform in response to a dynamic balance of forces exerted thereon during the launch stroke, by said bridle, said vehicle, said towing element, and said track.

4. A runway installed vehicle catapulting system comprising a rail secured to said runway generally along the center line thereof and a dolly comprising a pair of trucks having means connected thereto adapted to engage said rail for movement of said trucks therealong, a normally flat, elastically deformable member interconnecting said trucks, said member having intermediate its ends (a) means operative to receive a towing element, (b) means operative to receive a vehicle bridle, and (c) means operative to receive a portion of said vehicle, said member being operative to elastically deform in response to the system of forces exerted upon it during the launch stroke.

References Cited

UNITED STATES PATENTS 2,862,682  12/1958  Davies.
3,228,630  1/1966   Byrne et al.

MILTON BUCHLER, *Primary Examiner.*

P. E. SAUBERER, *Assistant Examiner.*